(12) United States Patent
Newman et al.

(10) Patent No.: US 10,259,454 B2
(45) Date of Patent: Apr. 16, 2019

(54) SYSTEM FOR CONTROLLING A VEHICLE BASED ON WHEEL ANGLE TRACKING

(71) Applicant: NIO USA, Inc., San Jose, CA (US)

(72) Inventors: Austin Newman, San Jose, CA (US); Dennis Polischuk, San Jose, CA (US)

(73) Assignee: NIO USA, Inc., San Jose, CA (US)

( * ) Notice: Subject to any disclaimer, the term of this patent is extended or adjusted under 35 U.S.C. 154(b) by 121 days.

(21) Appl. No.: 15/394,925

(22) Filed: Dec. 30, 2016

(65) Prior Publication Data

US 2018/0134284 A1    May 17, 2018

Related U.S. Application Data

(60) Provisional application No. 62/422,661, filed on Nov. 16, 2016.

(51) Int. Cl.
| | |
|---|---|
| *B60W 30/00* | (2006.01) |
| *B60W 30/09* | (2012.01) |
| *B62D 6/00* | (2006.01) |
| *B60W 10/04* | (2006.01) |
| *B60W 10/20* | (2006.01) |
| *B60W 10/18* | (2012.01) |
| *G08G 1/16* | (2006.01) |
| *G05D 1/02* | (2006.01) |

(52) U.S. Cl.
CPC ............ *B60W 30/09* (2013.01); *B60W 10/04* (2013.01); *B60W 10/18* (2013.01); *B60W 10/20* (2013.01); *B62D 6/001* (2013.01); *B62D 6/002* (2013.01); *G08G 1/166* (2013.01); *B60W 2710/20* (2013.01); *B60W 2720/14* (2013.01); *G05D 1/0236* (2013.01); *G05D 1/0255* (2013.01); *G05D 1/0257* (2013.01)

(58) Field of Classification Search
USPC ...................................................... 701/36–49
See application file for complete search history.

(56) References Cited

U.S. PATENT DOCUMENTS

| | | | | | |
|---|---|---|---|---|---|
| 4,768,603 | A | * | 9/1988 | Sugiyama | B60G 7/006 180/408 |
| 7,278,511 | B1 | * | 10/2007 | Gass | B62D 7/1509 180/409 |
| 8,032,279 | B2 | * | 10/2011 | Rogers | G01B 11/2755 701/31.4 |
| 8,050,863 | B2 | * | 11/2011 | Trepagnier | B60W 30/00 180/167 |

(Continued)

OTHER PUBLICATIONS

Notice of Allowance for U.S. Appl. No. 15/394,919, dated Apr. 23, 2018, 9 pages.

*Primary Examiner* — Jonathan L Sample
(74) *Attorney, Agent, or Firm* — Sheridan Ross P.C.

(57) ABSTRACT

A control system has at least one sensor configured to track an orientation of a front wheel of a nearby vehicle and provide data indicative of the orientation. The control system also has a computing device including a processor and a memory. The computing device is configured to receive the data from the at least one sensor, determine a wheel angle parameter of the front wheel of the nearby vehicle based on the data, and generate a control command to change at least one of a direction or an acceleration of the vehicle based on the determined wheel angle parameter.

20 Claims, 7 Drawing Sheets

(56) References Cited

U.S. PATENT DOCUMENTS

| | | | |
|---|---|---|---|
| 9,014,904 B2* | 4/2015 | Higgins-Luthman | H04N 5/23229 382/104 |
| 9,367,067 B2 | 6/2016 | Gilmore et al. | |
| 9,573,623 B2* | 2/2017 | Moshchuk | B62D 6/002 |
| 2002/0032509 A1* | 3/2002 | Akita | B62D 7/159 701/41 |
| 2002/0165648 A1* | 11/2002 | Zeitler | G05D 1/0261 701/23 |
| 2005/0203705 A1* | 9/2005 | Izumi | B60T 7/22 701/301 |
| 2006/0184297 A1* | 8/2006 | Higgins-Luthman | B60R 1/00 701/41 |
| 2007/0088477 A1* | 4/2007 | Brewer | A01B 69/008 701/41 |
| 2007/0106475 A1* | 5/2007 | Kondoh | B60K 26/021 701/301 |
| 2008/0007428 A1* | 1/2008 | Watanabe | B60R 1/00 340/901 |
| 2009/0024320 A1* | 1/2009 | Nakamura | G01C 21/3415 701/414 |
| 2009/0179748 A1 | 7/2009 | Stephen et al. | |
| 2009/0312908 A1* | 12/2009 | Van Den Brink | B62D 9/02 701/38 |
| 2010/0114431 A1* | 5/2010 | Switkes | B60T 8/17557 701/41 |
| 2011/0035104 A1* | 2/2011 | Smith | B60G 17/017 701/37 |
| 2011/0035129 A1* | 2/2011 | Yasui | B60T 8/17558 701/70 |
| 2011/0148180 A1 | 6/2011 | Szelag et al. | |
| 2012/0109464 A1* | 5/2012 | Mizutani | B60W 10/184 701/42 |
| 2014/0002295 A1* | 1/2014 | Kimata | G08G 1/165 342/70 |
| 2014/0163824 A1* | 6/2014 | Kim | B60R 21/0136 701/45 |
| 2015/0009330 A1* | 1/2015 | Sobue | G08G 1/166 348/148 |
| 2015/0259008 A1* | 9/2015 | Seguchi | B62D 15/025 701/41 |
| 2016/0163198 A1* | 6/2016 | Dougherty | G08G 1/162 340/905 |
| 2016/0188987 A1 | 6/2016 | Lisseman et al. | |
| 2016/0191859 A1 | 6/2016 | Lisseman | |
| 2016/0229397 A1* | 8/2016 | Muthukumar | B60R 21/013 |
| 2016/0257341 A1* | 9/2016 | Lavoie | B62D 13/06 |
| 2016/0291145 A1* | 10/2016 | Zeng | G01S 13/723 |
| 2016/0291149 A1* | 10/2016 | Zeng | G01S 13/931 |
| 2016/0297432 A1* | 10/2016 | Fletcher | B60W 30/09 |
| 2016/0304122 A1* | 10/2016 | Herzog | B60D 1/36 |
| 2016/0368492 A1 | 12/2016 | Al-Stouhi | |
| 2017/0132334 A1 | 5/2017 | Levinson et al. | |
| 2017/0151944 A1 | 6/2017 | Al-Stouhi | |
| 2017/0330044 A1 | 11/2017 | Telpaz et al. | |
| 2017/0344023 A1 | 11/2017 | Laubinger et al. | |
| 2018/0029592 A1* | 2/2018 | Trombley | B60W 10/184 |
| 2018/0134281 A1* | 5/2018 | Newman | B60W 30/045 |
| 2018/0134284 A1* | 5/2018 | Newman | B60W 30/09 |

* cited by examiner

SYSTEM FOR CONTROLLING A VEHICLE BASED ON WHEEL ANGLE TRACKING

PRIORITY CLAIM

This application claims priority under 35 U.S.C. § 119 to U.S. Provisional Application No. 62/422,661, filed on Nov. 16, 2016 which is expressly incorporated by reference herein in its entirety.

FIELD OF INVENTION

The present disclosure relates to a system for controlling a vehicle, and, in particular, to a system for controlling a vehicle based on wheel angle tracking of a nearby vehicle.

BACKGROUND

Presently, autonomous vehicle technology, including advanced driver assistance system (ADAS) technology, is advancing. More and more autonomous vehicles are being put into operation on the roads. In order for autonomous vehicles to operate safely, they must make decisions based on the movement or predicted movement of other vehicles, including other autonomous vehicles and manually-driven vehicles. It is relatively simple for an autonomous vehicle to stay on the road or in a lane, but it is more complicated when the unknown movements of other vehicles are introduced. Thus, it would be advantageous for autonomous vehicles to collect and use information which may be helpful in predicting and/or determining the future motion of another vehicle on the road.

Current autonomous vehicles have an ability to track other vehicles on the road and identify when those vehicles may be traveling in a direction that may lead to a collision. The autonomous vehicle can then attempt to make a control adjustment to avoid the collision. Vehicle tracking typically includes following the body of the vehicle and its heading on the road. A change in motion of the vehicle may be detected after the mass of the vehicle has begun to shift and travel in another direction. The present disclosure is directed to improved systems and methods for tracking vehicles on the road and making determinations regarding the future travel of those vehicles based on collected data which indicates a direction of travel even before the mass of the vehicle has begun to shift.

SUMMARY

In one aspect, the present disclosure is directed to a control system of a vehicle. The control system includes at least one sensor configured to track an orientation of a front wheel of a nearby vehicle and provide data indicative of the orientation. The control system also includes a computing device including a processor and a memory. The computing device is configured to receive the data from the at least one sensor, determine a wheel angle parameter of the front wheel of the nearby vehicle based on the data, and generate a control command to change at least one of a direction or an acceleration of the vehicle based on the determined wheel angle parameter.

In another aspect, the present disclosure is directed to a method of controlling a vehicle. The method includes tracking an orientation of a front wheel of a nearby vehicle and determining a wheel angle parameter based on the tracked orientation. The wheel angle parameter is one of a measured wheel angle, a change in wheel angle, or a rate of change in wheel angle. The method further includes evaluating the wheel angle parameter, and adjusting at least one of a direction or an acceleration of the vehicle based on the evaluation.

In yet another aspect, the present disclosure is directed to a vehicle. The vehicle includes a vehicle body, a power system configured to accelerate the vehicle body, a braking system configured to decelerate the vehicle body, a steering system configured to control a direction of the vehicle body, and a control system configured to control at least one of a direction or an acceleration of the vehicle body. The control system includes at least one sensor configured to track an orientation of a front wheel of a nearby vehicle and provide data indicative of the orientation, and a computing device including a processor and a memory. The computing device is configured to receive the data from the sensor and determine a wheel angle parameter of the front wheel of the nearby vehicle based on the data. The wheel angle parameter is one of a measured wheel angle, a change in wheel angle, or a rate of change in wheel angle. The computing device is further configured to generate a control command to change at least one of a direction or an acceleration of the vehicle body based on the determined wheel angle parameter.

BRIEF DESCRIPTION OF THE DRAWING(S)

DETAILED DESCRIPTION OF THE PREFERRED EMBODIMENT(S)

Typically, motor vehicles have four or more wheels that each have a tire that is in contact with a road surface. The front wheels are connected to a steering system such that a wheel angle of the front wheels may be adjusted in order to turn and/or shift a path of the vehicle. Wheel angle may refer to an angle of the wheel and tire relative to the longitudinal axis of the vehicle. The front wheels of a vehicle that is traveling straight are generally parallel to the longitudinal axis. When the front wheels are turned, the body of the vehicle follows in the direction of turning. In operation, the wheels are turned to shift the vehicle and deviate from a straight path, such as to move to another lane, turn onto a different road, park the vehicle, etc. Thus, tracking of the vehicle wheels and their angle relative to the rest of the vehicle can provide information about the future motion and location of that vehicle.

The present disclosure provides a system which includes a sensing component and computing component implemented in a vehicle. The sensing component is configured to capture a parameter (e.g., condition, characteristic, state, etc.) of a nearby wheel indicative of an angle of that wheel relative to the rest of the nearby vehicle. This could be done with radar, ultrasonics, LIDAR, camera devices, or other types of sensors. The computing component includes a processing device configured to analyze the captured parameter and determine motion of the nearby vehicle. For example, the computing component is configured to identify a change in direction of the nearby vehicle based on a tracked wheel angle parameter.

By tracking the wheel angle of surrounding vehicles, a computing device on a vehicle can process where the surrounding vehicle was and also detect the angle of the wheels at each instance. For example, the computing device, via processing, could detect a front wheel angle change (and the degree of change) before a human-piloted or autonomous car has even begun to shift its mass, thus giving the vehicle time to make adjustments (e.g., to allow the nearby vehicle enough space to make the lane change, maintain a distance to the nearby vehicle, avoid collision, etc.).

The detected change in direction of the nearby vehicle may be based on a number of analysis techniques, such as by tracking the location of distinctive points on the vehicle, edge detection, distance detection, image comparison, etc. In general, the computing device may detect a change by comparing data to previously captured data to identify changes in wheel angle over time. In some embodiments, the data may be compared to known characteristics of certain changes, such as those associated with known characteristics of a wheel that is turning.

Figure 1:
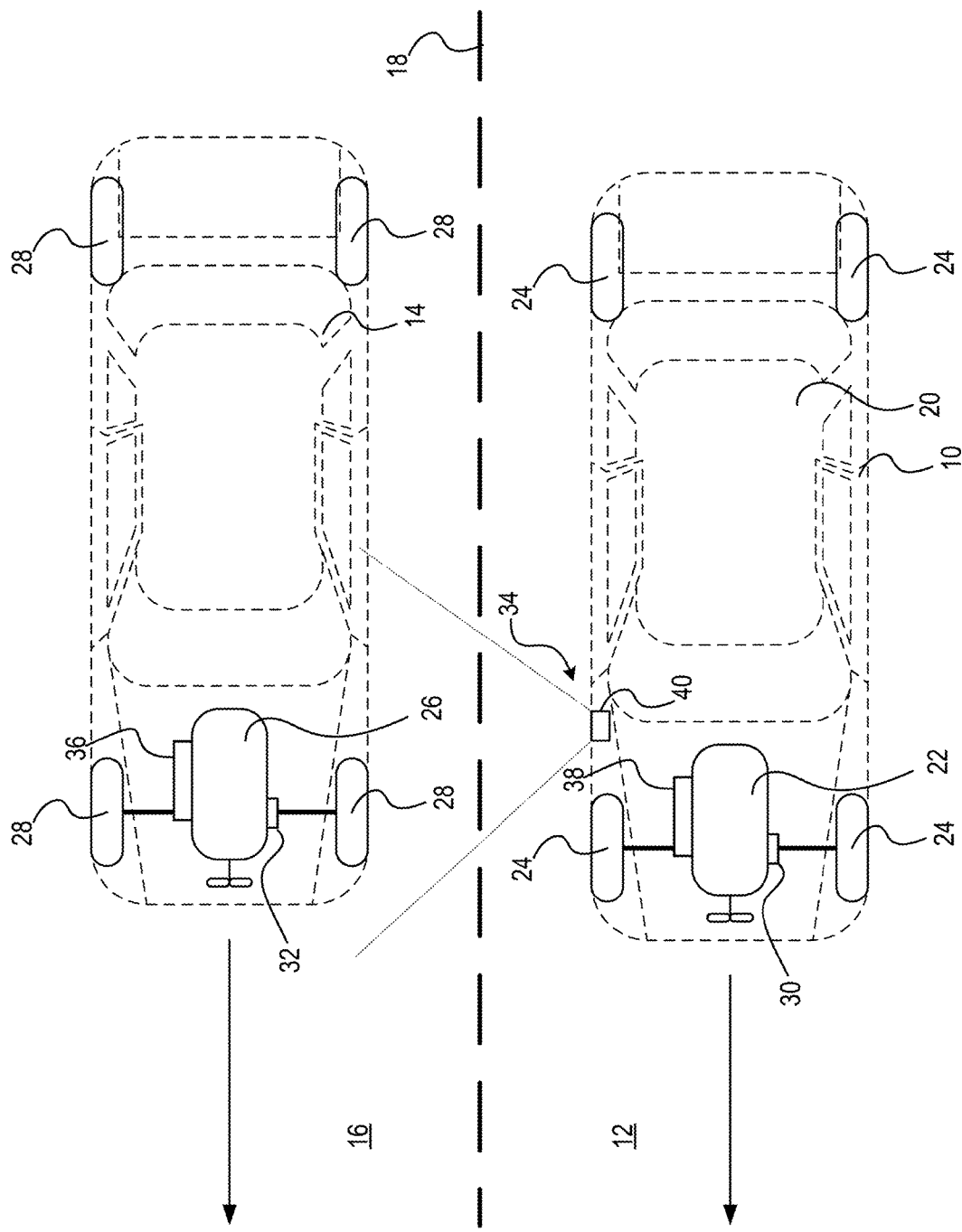
FIG. 1 is a schematic top-view illustration of a pair of vehicles traveling on a road.

FIG. 1 is a schematic illustration of two vehicles traveling on a roadway. In the exemplary scenario depicted in FIG. 1, a vehicle 10 is traveling in a first lane 12 of a road and a nearby vehicle 14 is traveling in the same direction in an adjacent second lane 16 of the road, identifiable via a road marking 18. In an exemplary embodiment, the vehicle 10 includes a system for tracking the nearby vehicle 14. It should be understood that the vehicle 14 may additionally or alternatively include the tracking system described herein. It should be understood that the illustrated scenario of two vehicles traveling in the same direction is exemplary and that the disclosed systems and method may apply equally to other driving situations.

The vehicle 10 includes a vehicle body 20 which may include conventional features including a chassis, outer shell, and interior passenger compartment. The vehicle 10 further includes a power system 22 and a plurality of traction devices 24. The power system 22 includes, for example, a motor and/or an engine, such as an electric motor connected to a battery module for an electric vehicle or an internal combustion engine. The plurality of traction devices 24 include vehicle wheel assemblies (including wheels, tires, etc.) which are driven by the power system 22 to propel the vehicle body 20. The nearby vehicle 14 similarly includes a power system 26 and a plurality of traction devices 28 to propel the nearby vehicle 14.

The vehicle 10 further includes a steering system 30 operably connected to, for example, the front wheels of the plurality of traction devices 24. The steering system 30 includes, for example, interconnected components (e.g., arms, links, rods, pivots, gears, etc.) that are configured to adjust a wheel angle of the front wheels in order to change a direction of the vehicle 10. The steering system 30 may include a steering wheel for manual steering in addition to automated components. The nearby vehicle 14 may similarly include a steering system 32.

The vehicle 10 and nearby vehicle 14 may be autonomous vehicles, manually-driven vehicles, or a combination thereof (e.g., a manually-driven vehicle having at least one ADAS, such as a collision avoidance system). In an exemplary embodiment, the vehicle 10 is at least partially autonomous in that it includes a control system 34 which can implement automated control of the vehicle 10 based on the movement of the nearby vehicle. The automated control may change at least one of an acceleration or a direction of the vehicle 10. The control system 34 allows the vehicle 10 to track the nearby vehicle 14 (or a plurality of nearby vehicles) and make decisions on whether driving adjustments become necessary to accommodate and react to the other vehicles on the road.

The nearby vehicle 14 may include a same or similar control system to that of the vehicle 10. In an exemplary embodiment, the nearby vehicle 14 includes an on-board computer 36. The on-board computer 36 may implement some autonomous control, such as to change an acceleration and/or a direction of the nearby vehicle. In other embodiments, the on-board computer 36 does not provide autonomous control of the nearby vehicle 14.

In an exemplary embodiment, the control system 34 includes at least a controller 38 and at least one sensor 40. The controller 38 may be a computing device configured to generate a control command to change an acceleration (e.g., by braking and/or producing power via power system 22) and/or a direction (e.g., via the steering system 30) of the vehicle 10. The at least one sensor 40 is configured to collect data and/or take measurements to provide to the controller 38 via an operable connection.

The at least one sensor 40 is configured to detect, measure, and/or collect information about surrounding conditions. For example, the sensor 40 is configured to capture information related to a parameter of a surrounding condition and generate a signal indicative of that parameter. The sensor 40 may use, for example, radar, ultrasonic, LIDAR, camera, or other similar technology to capture the information. As shown in FIG. 1, the at least one sensor 40 is preferably directed toward the nearby vehicle 14 such that the collected data is associated with the nearby vehicle 14.

Figure 2:
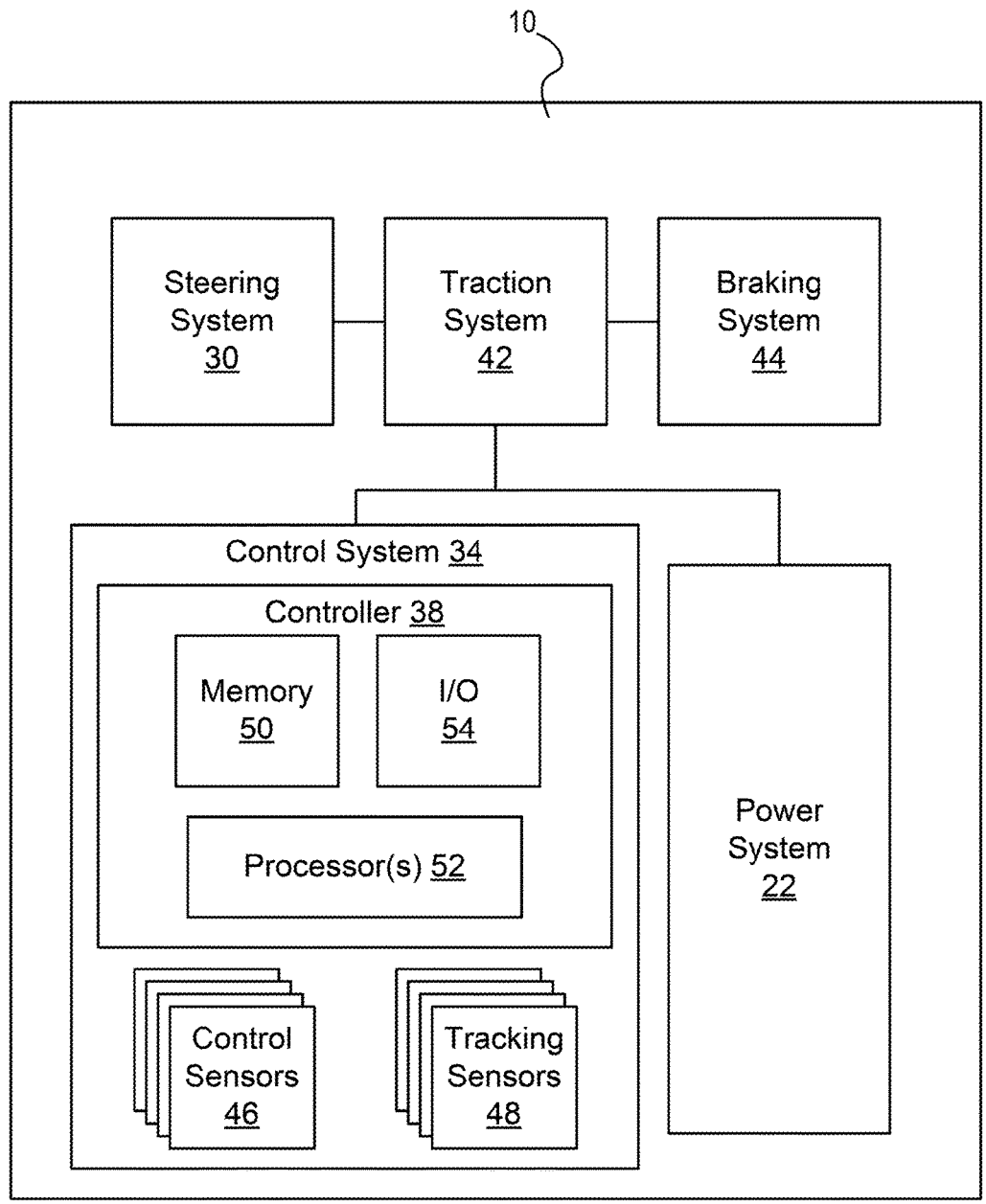
FIG. 2 is a schematic illustration of a vehicle including a plurality of vehicle systems.

FIG. 2 is a schematic diagram of the exemplary systems that may be included as part of the vehicle 10. As previously described, the vehicle 10 may include the power system 22, steering system 30, and control system 34. Each of these systems is operably connected to a traction system 42 which includes the plurality of traction devices 24. In addition, the traction system 42 is operably connected to a braking system 44 which includes one or more brakes configured to slow and/or stop the vehicle 10.

As shown in FIG. 2, the control system 34 includes the controller 38, one or more control sensors 46, and one or more wheel tracking sensors 48. The controller 38 includes computing components, which, in an exemplary embodiment, include a memory 50, at least one processor 52, and an I/O device 54. The controller 38 may be embodied as an onboard computing device in which the processor 52 executes software instructions stored by the memory 50. The I/O device 54 may include input and/or output hardware and/or software which provided acts as a communication port for the controller 38. For example, the I/O device 54 may be an operable connection between the processor 52 and the sensors 46 and/or 48.

The control system 34, including the controller 38 is preferably operably connected to each of the power system 22, the steering system 30, and the braking system 44. In particular, the control system 34 is preferably configured to implement a control command to one or more of these systems in order to automatically control the vehicle 10. For example, the control system 34 is configured to adjust an acceleration of the vehicle 10 through the power system 22 and/or braking system 44 and/or adjust a direction of the vehicle 10 through the steering system 30.

The control sensors 46 are an optional feature which may be included in embodiments in which the vehicle 10 is an autonomous vehicle. The control sensors 46 may include, for example, temperature sensors, engine performance sensors, battery performance sensors, cameras, radar, LIDAR, ultrasonics, etc., for collecting data in an around the vehicle 10 and generating signals which are transmitted to the controller 38. These signals may be indicative of operating parameters, environmental parameters, road parameters, or the like, and which may be provide the controller 38 with information which may be used to operate the vehicle 10. For example, the controller 38 may provide a control command to one of the systems of the vehicle 10 in order to automatically control the vehicle 10 in some manner. In other examples, the controller 38 may provide the information to a driver through the I/O device 54.

The wheel tracking sensors 48 include or consist of the at least one sensor 40 which is configured to detect, measure, and/or collect information about surrounding conditions. The sensor 40 is configured to gather information about the nearby vehicle 14. Consistent with disclosed embodiments, the sensor 40 is configured to gather information which indicates an orientation of a front wheel of the nearby vehicle 14. The sensor 40 is configured to collect the data continuously such that orientation can be tracked over time and a wheel angle parameter can be identified, as will be further described.

Figure 3:
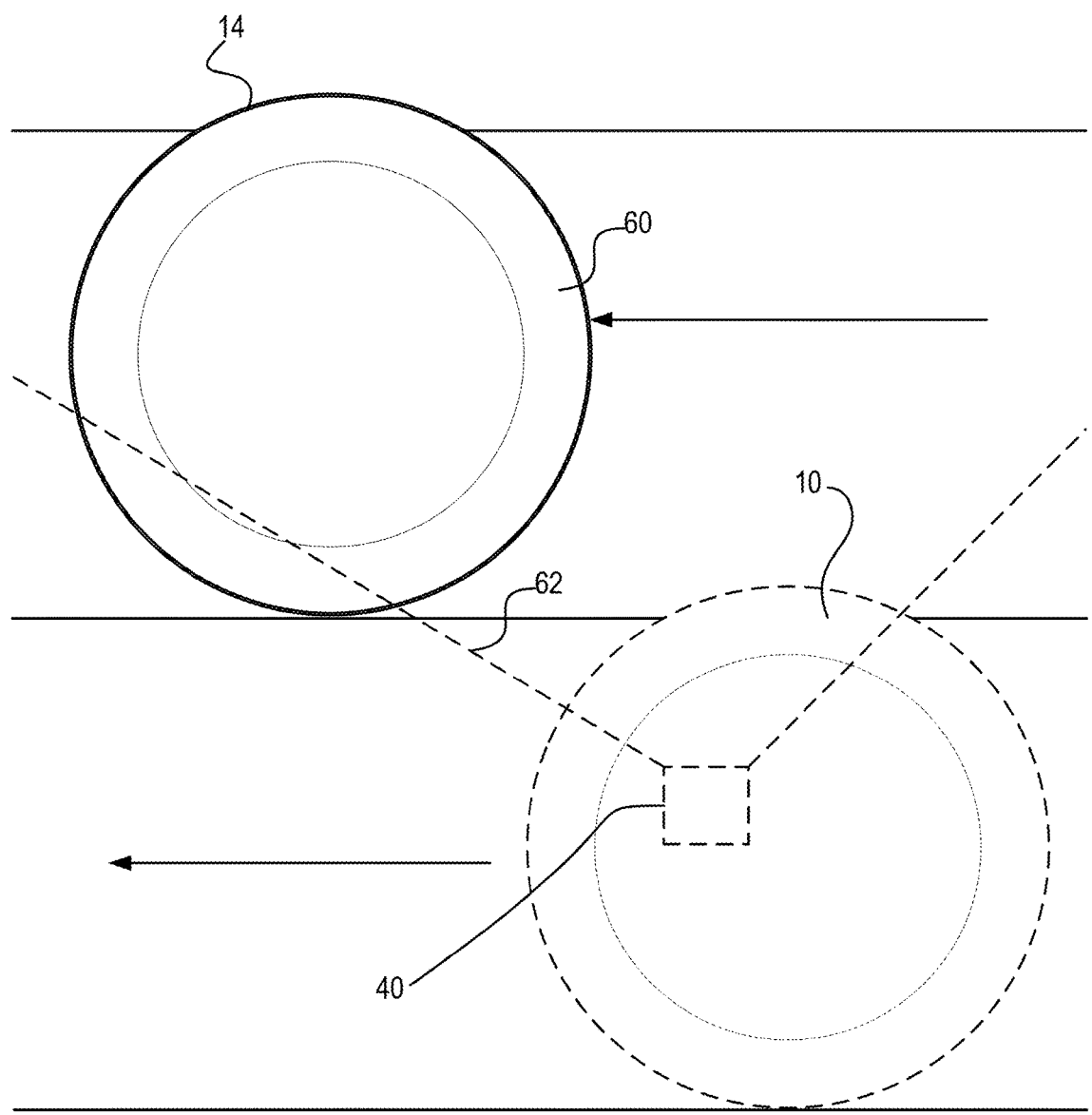
FIG. 3 is a schematic side-view illustration of an exemplary wheel angle detection system.

FIG. 3 illustrates a schematic side view of a wheel angle detection system which includes the sensor 40 being directed toward a front wheel 60 of the nearby vehicle 14. While the sensor 40 is shown connected to a wheel of the vehicle 10, it should be understood that the wheel represents the entire vehicle 10 and that the sensor 40 may be placed anywhere on the vehicle 10, and is not necessarily on a wheel. Moreover, the nearby vehicle 14 includes more components than the front wheel 60, including a body portion adjacent to the front wheel 60 (e.g., wheel well, fender, door panel, running board, etc.).

In an exemplary embodiment, the sensor 40 is configured to capture information in a viewing area 62. The sensor 40 may be configured to move (e.g., articulate) in order to change the viewing area 62. The viewing area 62 represents an area in which the sensor 40 is capable of collecting data and is not limited by the illustrated example.

The sensor 40 is preferably mounted on the vehicle 10 such that the viewing area 62 corresponds to an area near the vehicle 10. For example, the sensor 40 may be configured such that the viewing area 62 is in the vicinity of the front wheel 60 of the nearby vehicle 14. The nearby vehicle 14, as described herein, may be a vehicle in another lane of the roadway (either traveling in the same direction or another direction) on which the vehicle 10 travels. In an exemplary embodiment, the sensor 40 is one or more of a radar sensor, an ultrasonic sensor, a LIDAR sensor, or a camera.

Figure 4:
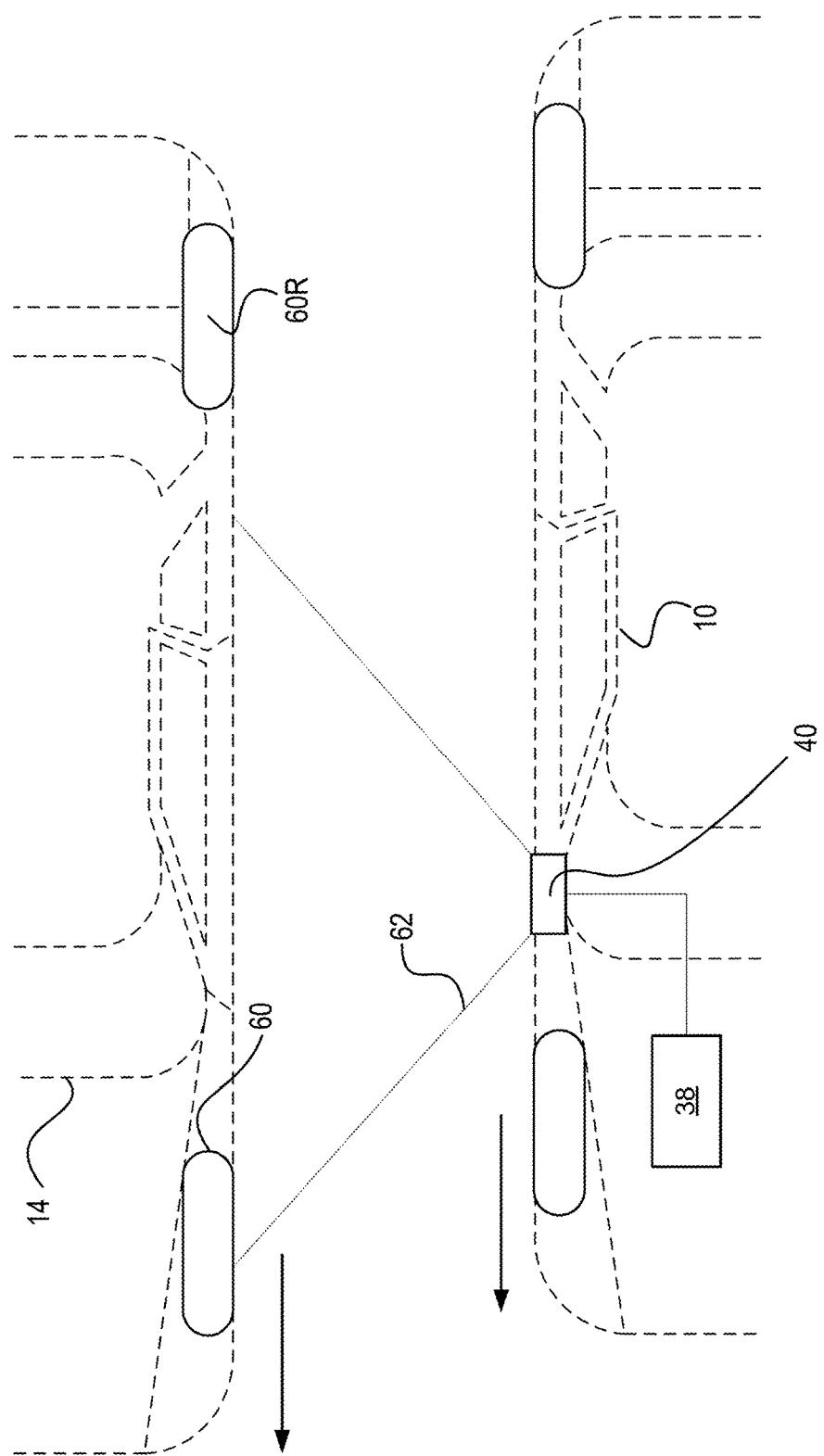
FIG. 4 is a schematic top-view illustration of the disclosed wheel angle detection system, including an opposing vehicle wheel traveling straight.
Figure 5:
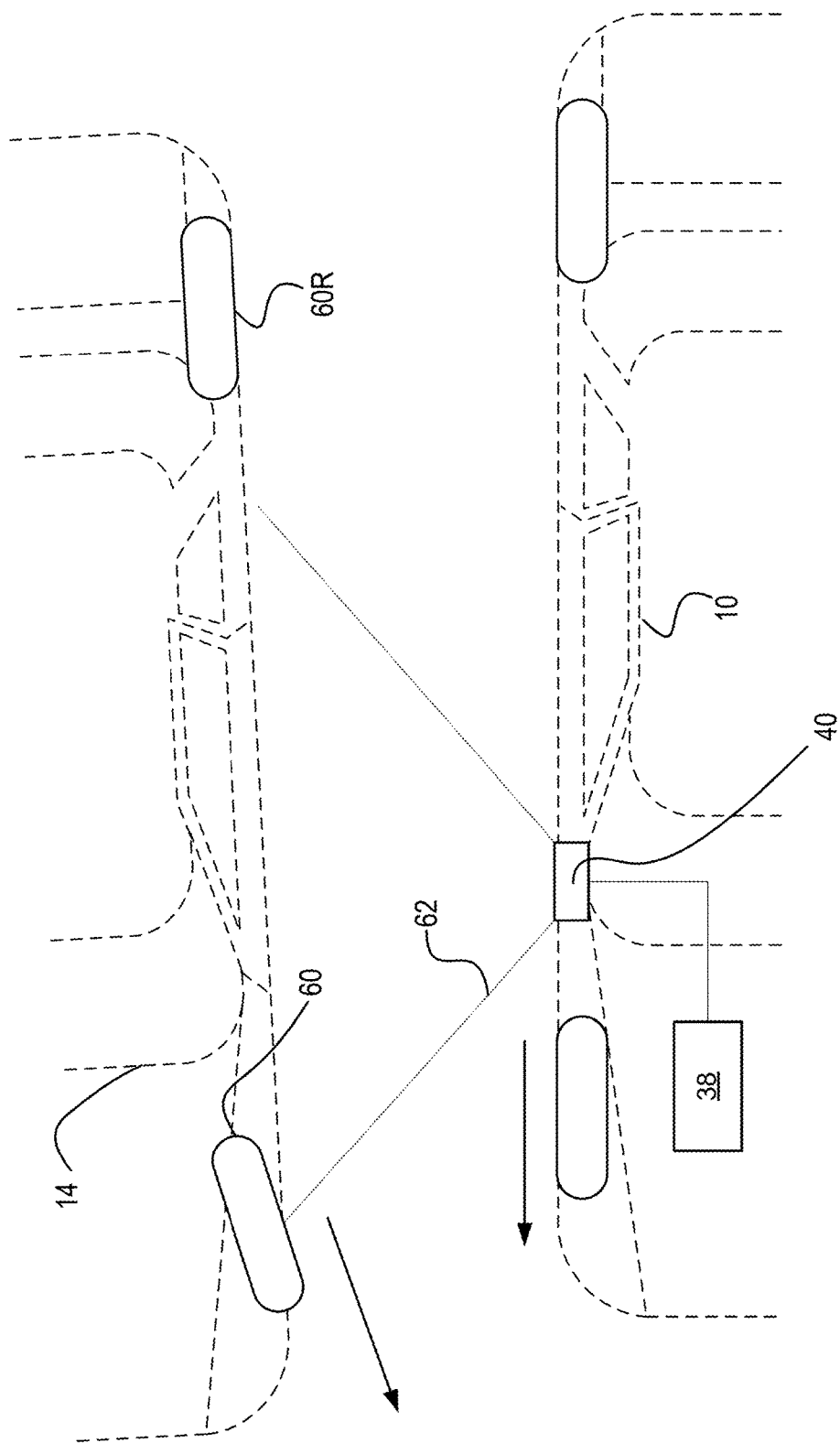
FIG. 5 is a schematic top-view illustration of the wheel angle detection system of FIG. 4, including an opposing vehicle wheel after it has begun to turn.

FIGS. 4-5 further illustrate a top-view of the vehicles 10, 14 and the detection system, according to a first embodiment. FIGS. 4-5 illustrate an example scenario for the detection system in which the control system 34 of the vehicle 10 may track an orientation of the front wheel 60 of the nearby vehicle 14 via the at least one sensor 40. As shown, the sensor 40 is configured to gather information related to the front wheel 60 of the nearby vehicle 14. In some embodiments, the sensor 40 (or a second sensor 40 working in conjunction with the detection system) may also gather information related to a rear wheel 60R of the nearby vehicle 14.

In FIG. 4, the nearby vehicle 14 is traveling straight and/or maintaining its position within an associated lane. The sensor 40 is configured to capture data which indicates that the wheel angle is 0° or another value that indicates it is generally straight and/or staying parallel to the lane. In FIG. 5, the nearby vehicle 14 has begun to turn toward the vehicle 10. The wheel angle has changed to another value which indicates the turn. Even before the mass of the vehicle begins to shift or turn, the wheel angle would indicate the upcoming change. The sensor 40 is configured to capture data which indicates that the wheel angle of the front wheel 60 has changed.

In an exemplary embodiment, the sensor 40 collects data indicative of an orientation of the front wheel 60 of the nearby vehicle 14 and transmits the data to the controller 38. This data allows the control system 34 to track the orientation of the front wheel 60 over time. For example, the controller 38 may be configured to receive the data and determine a wheel angle parameter based on the tracked orientation. The wheel angle parameter may be a value, classification, or categorization of the front wheel 60. For example, the wheel angle parameter may be one of a measured wheel angle, a change in wheel angle, or a rate of change in wheel angle. The controller 38 is configured to evaluate the wheel angle parameter and determine whether the vehicle 10 should be controlled in some manner due to the wheel angle parameter. For example, the controller 38 may determine that the wheel angle parameter indicates that the nearby vehicle 14 may collide with the vehicle 10 if an evasive maneuver is not performed.

Figure 6:
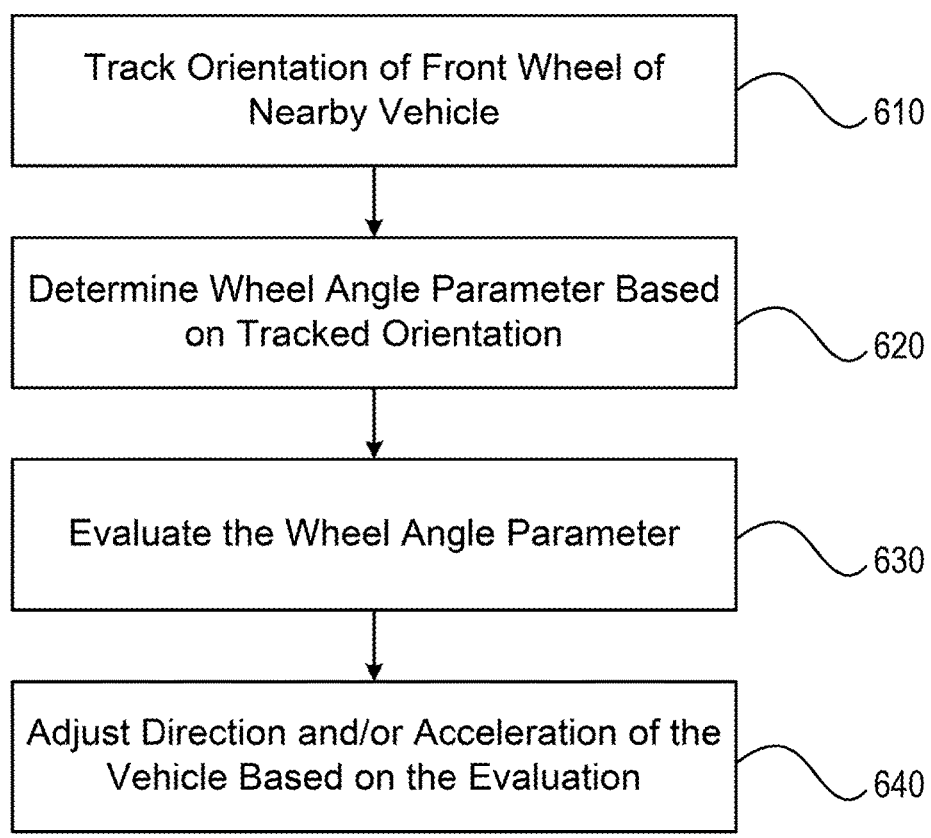
FIG. 6 is a flowchart of an exemplary wheel angle detection process using wheel angle tracking.

FIG. 6 is a flowchart of an exemplary vehicle control process 600 according to the embodiment of the detection system illustrated in FIGS. 4-5. The controller 38 may perform the process 600, such as through the execution of software stored in the memory 50 by the at least one processor 52 and, moreover, based on data received from the at least one sensor 40. It should be understood however, that one or more other components of the control system 34 (or other components) may perform one or steps of the process 600.

In step 610, the controller 38 tracks the orientation of the front wheel 60 of the nearby vehicle 14. For example, the sensor 40 may collect data indicative of the orientation of the front wheel 60 and provide the data to the controller 38. In one example, the sensor 40 is configured to capture a plurality of images of the front wheel 60 of the nearby vehicle 14. The captured images may provide information which is indicative of the wheel orientation.

In some embodiments, the sensor 40 is configured to provide information for point tracking. For example, the sensor 40 may provide the captured images which provide sufficient information such that one or more points in the images may be tracked to identify a wheel orientation. In other examples, the sensor 40 may be a distance sensor (e.g., radar, LIDAR, ultrasonics) which provides information regarding the location of one or more points on the nearby vehicle 14.

In an exemplary embodiment, the sensor 40 provides data configured to track at least two points on the nearby vehicle 14. For example, the sensor 40 may track a distance from the sensor 40 to a particular point on the nearby vehicle 14. At least one of the tracked points may be on the front wheel 60. When two points are tracked, at least one of them being on the front wheel 60, an orientation of the front wheel 60 may be determined. For example, the location of a point on the wheel 60 may be tracked in comparison to a point on the body of the nearby vehicle 14. Because the orientation of the body does not change, a relative change in tracked locations indicates a change in wheel angle. In another example, both tracked points may be on the front wheel 60. For example, points on opposite sides of the front wheel 60 may be tracked with their relative locations being indicative of a change in wheel angle. In yet another example, the sensor 40 (or plurality of sensors 40) may track the front wheel 60 and the rear wheel 60R with a difference in orientation being indicative of a wheel angle of the front wheel 60.

In step 620, the controller 38 determines a wheel angle parameter of the front wheel 60 based on the tracked orientation. For example, the controller 38 may analyze received data from the sensor 40 to identify a wheel angle, a change in wheel angle, and/or a rate of change of wheel angle. The controller 38 may determine the wheel angle parameter by tracking the wheel 60 in a plurality of images, performing the point tracking described above, and/or through some other method, such as edge tracking.

In step 630, the controller 38 evaluates the wheel angle parameter. In one embodiment, the controller 38 compares the wheel angle parameter to a threshold value. For example, if the wheel angle parameter is a value of a rate of change in wheel angle, the controller 38 may compare that value to a threshold rate of change in wheel angle. If the measured value is greater than the threshold value (or vice versa), this may indicate that the nearby vehicle 14 has abruptly steered toward the vehicle 10 and that the nearby vehicle 14 is likely to move out of its lane and into the lane of the vehicle 10.

In some embodiments, the controller 38 may first determine the threshold value. The controller 38 may need to determine the threshold value because the same wheel angle parameter may not indicate the same information depending on the situation. For example, if the vehicles 10 and 14 are not near each other and/or are traveling slowly, a larger wheel angle parameter may be acceptable. In another example, if the road curves at a particular location, the nearby vehicle 14 may be changing a wheel angle to stay within their lane. In this situation, the threshold value may be greater than in situations in which the lane is straight.

The controller 38 may determine the threshold value based on one or more additional detected parameters. These additional detected parameters may include, for example, a distance of the vehicle 10 to the nearby vehicle 14, a speed of the vehicle 10, a speed of the nearby vehicle 14, a path of the road, or a wheel angle parameter of the vehicle. In this way, the controller 38 may consider additional factors in evaluating the wheel angle parameter.

In another embodiment, the controller 38 may evaluate the wheel angle parameter by projecting a path of the nearby vehicle 14 based on the wheel angle parameter. For example, the controller 38 may use the wheel angle parameter, such as wheel angle and/or a rate of change of wheel angle, to determine a trajectory of the nearby vehicle 14 on the road. The controller 38 may be configured to use the projected path to determine predict where the nearby vehicle 14 is likely to travel and compare the prediction to other conditions. For example, the controller 38 may compare the projected path of the nearby vehicle 14 to at least of one of a path of the road and/or a projected path of the vehicle 10. This comparison indicates whether the projected path of the nearby vehicle 14 will or could interfere with the path of the vehicle 10.

In step 640, the controller 38 is configured to adjust at least one of a direction or an acceleration of the vehicle 10 based on the evaluation of the wheel angle parameter. For example, the controller 38 is configured to accelerate, decelerate, and/or turn the vehicle 10 when the evaluation of the wheel angle parameter indicates that the nearby vehicle 14 will or could reasonably interfere with the path of the vehicle 10. For instance, if the controller 38 determines that the nearby vehicle 14 is going to move into the same lane as the vehicle 10, the controller 38 may provide a control command to the braking system 44 to slow the vehicle 10. The controller 38 may provide similar control commands to the power system 22, steering system 30, or other system of the vehicle 10 in order to adjust a control of the vehicle 10.

In the example in which the controller 38 compares the wheel angle parameter to a threshold value, the controller 38 may determine that the measured value exceeds the threshold value, and, thus, a control adjustment is necessary. In the example, in which the controller 38 projects the path of the nearby vehicle 14 based on the wheel angle parameter, the controller 38 may determine that the projected path will interfere with the path of the vehicle 10 and produce a control command to adjust the path of the vehicle 10. In an exemplary embodiment, the control command capability of the controller 38 based on wheel angle detection may be integrated into an autonomous control scheme of the vehicle 10 and/or may be used to override manual driver commands in a vehicle which is being manually-driven. In some embodiments, the control command may produce a warning to a driver regarding the tracked nearby vehicle 14.

Figure 7A:
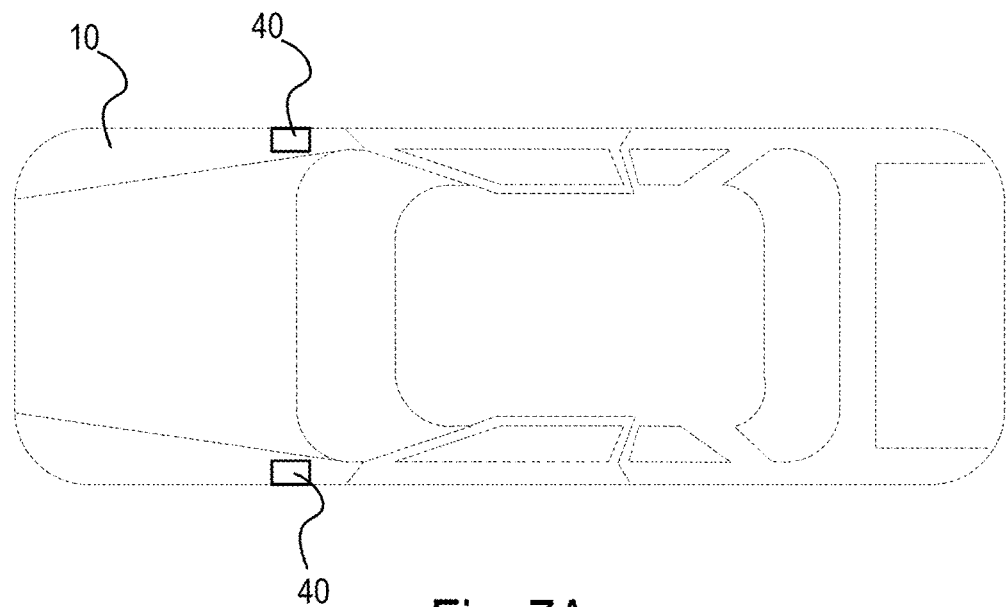
FIGS. 7A and 7B are exemplary sensor configurations for use in a disclosed wheel angle detection system.
Figure 7B:
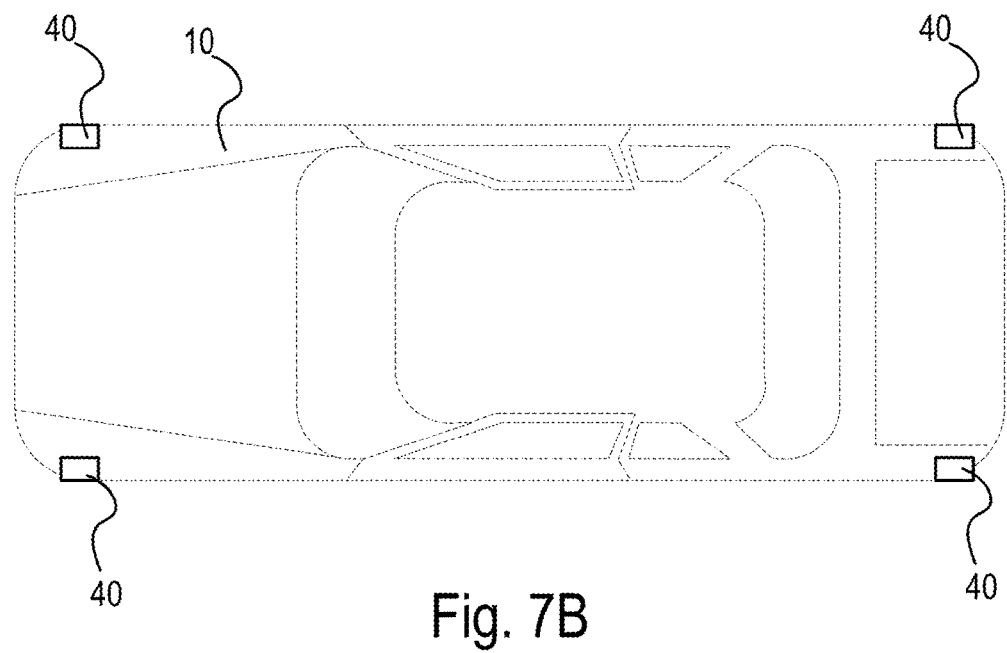

The disclosed embodiments may be implemented in any vehicle 10 in a manner that allows the disclosed methods to be performed. FIGS. 7A and 7B provide exemplary schematic illustrations of detection systems that may include a plurality of sensors 40. FIG. 7A illustrates an embodiment in which two sensors are implemented, one on each side of the vehicle 10. FIG. 7B illustrates an embodiment in which four sensors are implemented, one in each corner area of the vehicle 10. These configurations, while not limiting, provide examples which provide wide-ranging vision to the detection and control system of the vehicle 10, allowing the tracking of multiple vehicles in various locations (i.e., on both sides of the vehicle 10). Moreover, the use of the multiple sensors 40 on the same side allows for tracking of two vehicle on that side and/or may more easily allow for tracking of two wheels (e.g., front wheel 60 and rear wheel 60R) on the same vehicle.

The disclosed systems provide a detection and control system which allows a vehicle 10 to track a nearby vehicle 14 and make control decisions based on information gathered about the behavior of the nearby vehicle 14. This includes tracking an orientation of a front wheel in order to identify a wheel angle parameter. The wheel angle parameter provides information which allows the control system to predict movement of the nearby vehicle before the mass of the vehicle has started to move toward an area which may cause a dangerous condition. This provides additional time for vehicle reaction over other tracking systems which may track the movement and/or location of the entire vehicle. This additional reaction time may allow autonomous vehicles to travel safely while on the roads.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A control system of a vehicle, comprising:
   at least one sensor configured to track an angular orientation of a front wheel of a nearby vehicle and provide data indicative of the angular orientation of the front wheel while the nearby vehicle is traveling parallel to a longitudinal axis of the vehicle; and
   a computing device including a processor and a memory, the computing device configured to:
      receive the data;
      determine, while the nearby vehicle is traveling parallel to the longitudinal axis of the vehicle, a wheel angle parameter of the front wheel of the nearby vehicle based on the data, wherein the wheel angle parameter defines an angle of the front wheel relative to the longitudinal axis of the vehicle; and
      generate a control command to change at least one of a direction or an acceleration of the vehicle based on the determined wheel angle parameter.

2. The control system of claim 1, wherein the at least one sensor is further configured to track an angular orientation of a body of the nearby vehicle and provide body angle data indicative of an angle of the body relative to the longitudinal axis, wherein the computing device is further configured to receive the body angle data, and wherein the wheel angle parameter corresponds to a change in the angle of the front wheel relative to the angle of the body.

3. The control system of claim 2, wherein the computing device is configured to compare the wheel angle parameter to a threshold value and generate the control command based on the comparison.

4. The control system of claim 3, wherein the computing device is configured to determine the threshold value based on one or more additional detected parameters.

5. The control system of claim 4, wherein the one or more additional detected parameters are selected from the group consisting of: a distance of the vehicle to the nearby vehicle, a speed of the vehicle, and a speed of the nearby vehicle, a path of the road, and a wheel angle parameter of the vehicle.

6. The control system of claim 2, wherein the computing device is further configured to project a path of the nearby vehicle based on the wheel angle parameter, and determine whether to generate the control command based on the projected path.

7. The control system of claim 1, wherein the at least one sensor includes one or more of a radar sensor, an ultrasonic sensor, a LIDAR sensor, or a camera.

8. The control system of claim 1, wherein the at least one sensor is configured to capture a plurality of images of the front wheel of the nearby vehicle and the computing device is configured to determine the wheel angle parameter from the captured images.

9. The control system of claim 1, wherein the at least one sensor is configured to track at least two points on the nearby vehicle, at least one point being on the front wheel, and the computing device is configured to determine the wheel angle parameter based on the location of the at least two points.

10. The control system of claim 9, wherein at least one point of the at least two points is on the vehicle body.

11. The control system of claim 9, wherein at least two points are on the vehicle front wheel.

12. A method of controlling a vehicle, comprising:
   tracking an angular orientation of a front wheel of a nearby vehicle;
   tracking an angular orientation of a body of the nearby vehicle while the nearby vehicle is traveling parallel to a longitudinal axis of the vehicle;
   determining, while the nearby vehicle is traveling parallel to the longitudinal axis of the vehicle, a change in the tracked angular orientation of the front wheel relative to the angular orientation of the body of the nearby vehicle;
   determining a wheel angle parameter of the front wheel of the nearby vehicle based on the determined change in the angular orientation, the wheel angle parameter defining an angle of the front wheel relative to the longitudinal axis of the vehicle;
   evaluating the wheel angle parameter; and
   adjusting at least one of a direction or an acceleration of the vehicle based on the evaluation.

13. The method of claim 12, wherein tracking the angular orientation of the front wheel includes capturing a plurality of images of the front wheel of the nearby vehicle and determining the wheel angle parameter includes processing image data to identify the wheel angle parameter.

14. The method of claim 12, wherein the change in the angular orientation of the front wheel occurs and is determined before a change in the angular orientation of the body occurs and is determined.

15. The method of claim 12, wherein evaluating the wheel angle parameter includes comparing the wheel angle parameter to a threshold value.

16. The method of claim 12, wherein evaluating the wheel angle parameter includes projecting a path of the nearby vehicle based on the wheel angle parameter.

17. A vehicle, comprising:
   a vehicle body;
   a power system configured to accelerate the vehicle body;
   a braking system configured to decelerate the vehicle body;
   a steering system configured to control a direction of the vehicle body; and
   a control system configured to control at least one of a direction or an acceleration of the vehicle body, the control system including:
      at least one sensor that tracks an angular orientation of a front wheel of a nearby vehicle and provide data indicative of the orientation of the front wheel while the nearby vehicle is traveling adjacent to the vehicle; and
      a computing device including a processor and a memory, the computing device programmed to:
         receive the data;
         determine a wheel angle parameter of the front wheel of the nearby vehicle based on the data, wherein the wheel angle parameter defines an angle of the front wheel relative to a longitudinal axis of the vehicle that is different from an angle of a body of the nearby vehicle relative to the longitudinal axis of the vehicle; and
         generate a control command to change at least one of a direction or an acceleration of the vehicle body based on the determined wheel angle parameter.

18. The vehicle of claim 17, wherein the at least one sensor includes a plurality of sensors, including at least one sensor on each side of the vehicle body.

19. The vehicle of claim 18, wherein the plurality of sensors include at least one sensor in each corner area of the vehicle body.

20. The vehicle of claim 17, wherein the at least one sensor includes one or more of a radar sensor, an ultrasonic sensor, a LIDAR sensor, or a camera.

* * * * *

UNITED STATES PATENT AND TRADEMARK OFFICE
CERTIFICATE OF CORRECTION

PATENT NO. : 10,259,454 B2
APPLICATION NO. : 15/394925
DATED : April 16, 2019
INVENTOR(S) : Austin Newman and Dennis Polischuk It is certified that error appears in the above-identified patent and that said Letters Patent is hereby corrected as shown below:

In the Claims

At Column 10, Line 50, please delete "provide" and insert --provides-- therein.

Signed and Sealed this
Twelfth Day of November, 2019

Andrei Iancu
*Director of the United States Patent and Trademark Office*